United States Patent

Lafont

[15] 3,707,700
[45] Dec. 26, 1972

[54] TELEMETRY SYSTEM INCORPORATING SYNCHROMIZATION OF RECEIVER WITH TRANSMITTER

[72] Inventor: Guy Lafont, Paris, France
[73] Assignee: Schlumberger Technology Corporation, New York, N.Y.
[22] Filed: Aug. 21, 1969
[21] Appl. No.: 851,868

[52] U.S. Cl. .................................340/18, 340/15.5
[51] Int. Cl. ...............................................G01v 1/16
[58] Field of Search .........................340/18, 15.5 BH

[56] References Cited

UNITED STATES PATENTS

3,559,163    1/1971    Schwartz...............................340/18

*Primary Examiner*—Rodney D. Bennett, Jr.
*Assistant Examiner*—N. Moskowitz
*Attorney*—William R. Sherman, Stewart F. Moore, Jerry M. Presson, Edward M. Roney, Ernest R. Archambeau, David L. Moseley, Michael J. Berger and James C. Kesterson

[57] ABSTRACT

An embodiment of the invention transmits signals from a borehole logging sonde through an armored cable to the earth's surface. In order to transmit different logging information signals through the cable, a time division multiplexing system is used. Individual time slots in a repeated sequence are each allocated to respective information signals. Although an information pulse will not appear in each of these time slots, one time slot is set aside for a sync pulse that does recur in each sequence. On the earth's surface, a demultiplexing circuit synchronizes itself with the downhole multiplexer through the assumption that any first-received pulse is the sync pulse. In response to this pulse, the demultiplexer segregates and distributes the succeeding time slot information in accordance with a predetermined program. The demultiplexer, on termination of the first sequence, once more reproduces the signal distribution cycle in response to the very next-received pulse. Because the sync pulse is the only pulse that is certain to occur in every sequence, the demultiplexer quickly locks into phase with the downhole multiplexer.

10 Claims, 8 Drawing Figures

DOWNHOLE CIRCUITS

TIME DIVISION DEMULTIPLEXER

FIG. 6

FIG. 7
CLOCK

FIG. 8
TIME DIVISION MULTIPLEXING SEQUENCE

TELEMETRY SYSTEM INCORPORATING SYNCHROMIZATION OF RECEIVER WITH TRANSMITTER

BACKGROUND OF THE INVENTION

1. Field of the Invention

This invention relates to borehole logging techniques, and more particularly, to a time division multiplexing signal transmission system for logging tools, and the like.

2. Description of the Prior Art

The need to identify oil bearing earth formations has been satisfied, to a large extent, through the use of tools that are drawn through boreholes drilled in the earth. Typically, one sort of these tools irradiate an adjacent formation with neutrons in either a steady flux or in a train of carefully controlled pulses. Usually, the steady flux of neutrons is influenced to a great extent by the formation porosity and the pulsed neutrons respond primarily to the chlorine concentration.

In analyzing these neutron responses, an indication of high porosity and low chlorine concentration almost unerringly identifies an oil-bearing earth structure.

In order to locate this structure as a function of borehole depth, a "natural gamma ray" log often is run with the other tools. Because the intensity of naturally occurring radioactivity varies for different earth strata, logs of the natural radioactivity taken on continuous and on pulsed neutron logging runs usually indicate the same relative intensities at the same depths. This similarity in the natural gamma ray logs enables the petroleum geologist to match the two neutron logs with accuracy and thus permit sound conclusions to be drawn through a comparison of the neutron logs.

To reduce the time required to log a borehole in order to produce information of this type, and thereby decrease drilling costs, it has been suggested to combine several logging tools in one sonde. In this manner, several logs can be run at the same time rather than separately and about half the time required to log a well.

Although combination tools of this sort are clearly advisable, the problem of transmitting information at high rates through more than 20,000 feet of cable is a formidable technical problem. For example, noise induced in the cable, "crosstalk" or electrical coupling between the signals in the different conductors in the cable, and degradation in the shape of the pulses transmitted through long cable lengths all combine to produce, at the earth's surface, an output signal of poor quality that is not entirely satisfactory for interpretation or for further processing. Consequently, a need exists to provide a signal transmission technique that will overcome this problem.

SUMMARY OF INVENTION

In accordance with the invention, signals from several borehole logging tools are each accorded a specific, separate transmission time slot in a recurring sequence of time slots. The sequence of slots is repeated at a rate that is higher than the highest frequency of the most probable time between signals from any one of the logging tools. This general technique of "interleaving" separate samples of different signals in individual time slots as part of a recurring sequence of slots is known as "time division multiplxing."

These multiplexed signals when received on the earth's surface are "demultiplexed" or separated and sent to individual circuits for processing into more readily usable information. The demultiplexing system on the earth's surface must be closely synchronized with the multiplexing circuit in the sonde in order to separate and route the information in each of the time slots to the correct respective processing circuit. This is accomplished in accordance with the invention through the reservation of one of the time slots for synchronization purposes. A pulse always is transmitted in this "sync" slot. The other slots, reserved for logging tool information signals may, or may not, have an information pulse in any particular sequence of slots.

The demultiplexing circuit on the earth's surface synchronizes itself with the multiplexer through the assumption that, at the termination of one sequence of time slots, the very next pulse is the sync pulse in the sync slot. The demultiplexer then distributes the subsequent pulses as though the correct slot had been chosen.

At the termination of this sequence of slots, the demultiplexer takes the next occurring pulse to be the sync pulse without regard to the actual character of the pulse so chosen. The signals in the next succeeding time slots then are distributed to respective processing circuits. Because the time slots allocated to the logging tool signals frequently will not include an information pulse, the demultiplexing circuit will continue to shift until it registers ultimately with the actual sync pulse. Once the demultiplexer engages the sync pulse it will, at the termination of the succeeding group of time slots, reengage with the next sync pulse inasmuch as the sync pulse always recurrs. In this last situation, the demultiplexer is synchronized with the downhole multiplexing circuit. On achieving synchronization, the demultiplexer transmits the succeeding interleaved logging tool information pulses to the correct respective circuits for further processing and analysis.

More particularly, a specific embodiment of the invention provides a storing circuit in the downhole tool that temporarily holds or memorizes the signals from one or more of the individual logging tools that were incorporated in the sonde. These signals are held during that time in which the time slots occur that are allocated to the sync pulse and one or more of the other tools. A downhole clock circuit drives a programmer in the multiplexing circuit to gate the temporarily memorized signals out of the storing circuit and to a cable signal driving circuit, each during the time slot reserved for the respective signal.

On the earth's surface, the signals are segregated through a synchronization circuit in the demultiplexer. The synchronization circuit responds to the first-received pulse in a sequence of time slots to initiate the separation of the succeeding logging tool signals. This distribution is accomplished through a synchronizer that controls a programmer. The programmer closes or opens in sequence an exemplary array of three switches, each switch being individual to a respective time slot.

As generally described above, the time division demultiplexer, to close each of these switches in proper order, must be in phase with the sequence in which the logging tool signals are being interleaved downhole.

When the system is operated initially, the synchronization circuit responds to the first-received pulse through a programmed enabling of the individual switches during periods of time that correspond to the respective time slots. At the end of a full cycle of switch operation, the synchronization circuit once more commences a switch closing cycle in response to the very next-received pulse after the end of the preceding cycle. After not more than a few switching cycles, the synchronization system locks in with the recurring sync pulse, rather than with one of the logging tool signals. The entire system functions best in an environment in which the logging tool signals have a high probability of time slot non-occurrence. Thus, the synchronization system shifts among the time slots in accordance with the pulse occurrence at the end of each group of four time slots until it registers with the recurring sync pulses.

A typical demultiplexing system embodying these principles might, for instance at the end of a sequence of time slots and concurrent switch closings, trigger a flip-flop circuit that enables a gate circuit in response to the very next input pulse. This pulse (assumed to be a sync pulse) is passed through the enabled gate circuit and sets the phase of a clock. Pulses from the clock then enable a second gate circuit that initiates the operation of a programmer circuit to proceed with another switch closing cycle. Although this foregoing description refers to three switches, it is clear that a larger or smaller group of switches can be used, depending on the number of time slots available in each sequence.

For a better understanding of the present invention together with other and further objects thereof, reference is had to the following description taken in connection with the accompanying drawings, the scope of the invention being pointed out in the appended claims.

DESCRIPTION OF THE PREFERRED EMBODIMENTS

General Description

Figure 1:
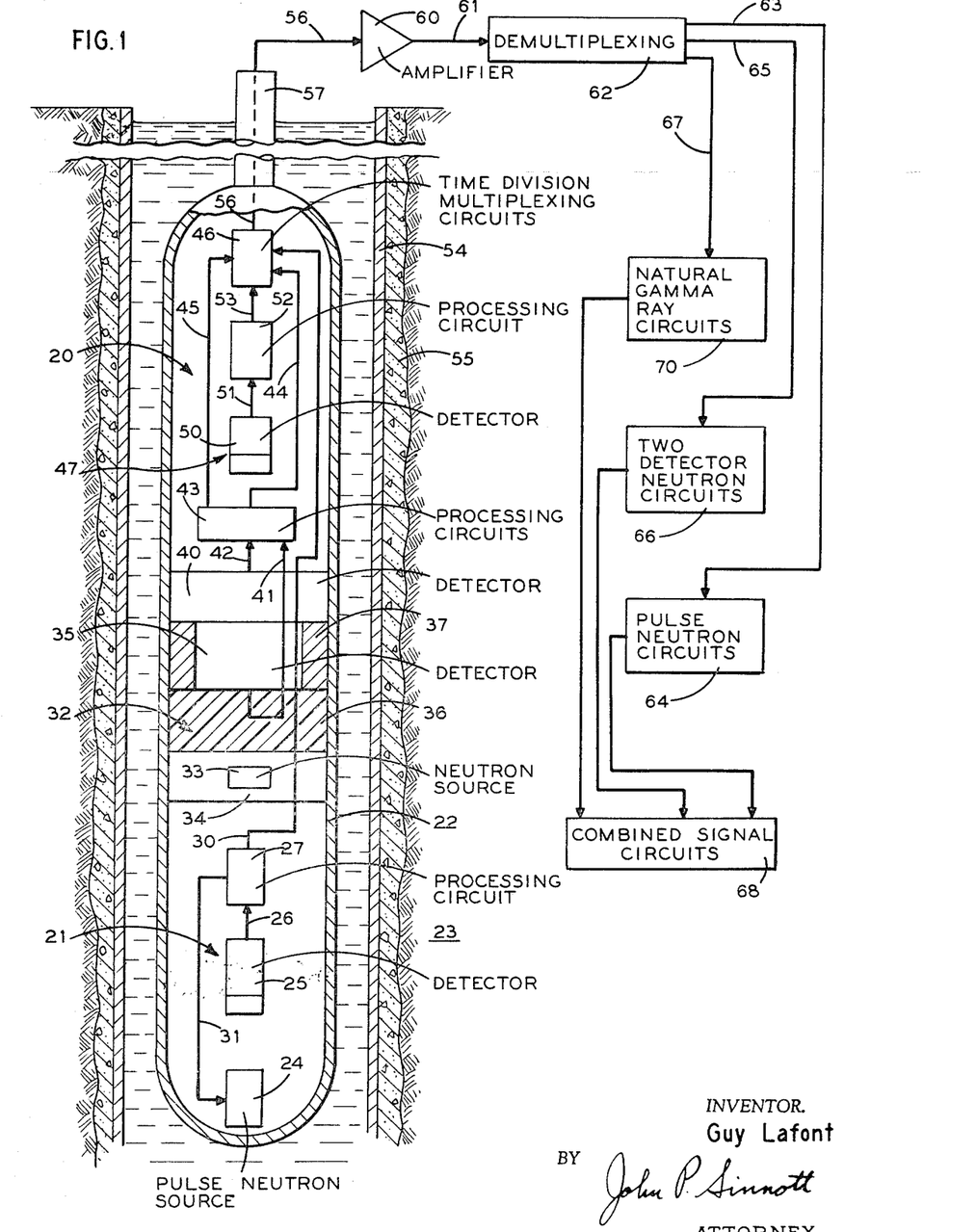
FIG. 1 shows a typical schematic diagram of a logging system embodying principles of the invention.

An illustrative embodiment of the invention is shown in FIG. 1 in which a logging sonde 20 comprises, for example, three logging tools. These tools, shown for the purpose of discussion, comprise a pulse neutron logging tool 21 suitably positioned in the lowermost portion of a fluid and pressure tight housing 22.

Ordinarily, the pulse neutron logging tool 21 measures the chlorine concentration of fluids in an adjacent earth formation 23. The tool accomplishes this measurement through the emission of neutrons from a neutron source 24 in carefully timed bursts or pulses. The absorption history of the emitted neutrons in the formation 23, observed through a suitable detector 25, provides an accurate indication of the formation's apparent salt water or chlorine concentration.

In this connection, chlorine exhibits an extremely high neutron absorption probability ("absorption cross section") relative to other common earth formation materials. Consequently, a rapid dissipation of the neutron population ordinarily demonstrates an abundance of salt water. The detector 25 usually comprises a scintillation crystal optically coupled to a photomultiplier tube. This combination converts the flash of light in the crystal caused by a gamma ray passing through the crystal, which was emitted in response to an absorbed neutron, into an electrical pulse at the output terminals of the photomultiplier tube.

Among the many alternative devices, a helium-3 ($He^3$) or a boron trifluoride filled neutron detector also might be used as an acceptable substitute for the scintillation detector.

The electrical pulses that correspond to the gamma-ray induced scintillations in the crystal, are sent from the photomultiplier tube through a conductor 26 to a processing circuit 27. The circuit 27 prepares the charge pulses in the conductor 26 for further manipulation in the cartridge housing 22. For instance, the processing circuit 27 typically includes a noise discriminator, amplifier and scaling circuits.

The scaling circuits reduce the number of received pulses by means of a constant factor. Ordinarily a scale-of four or scale of eight pulse reduction is adequate for this purpose. Scaling input pulses in this manner eases the signal transmission burden without introducing a corresponding loss of information and also tends to reduce the time-random character of observed radiation in order to provide a more uniform time distribution of the transmitted signals. Thus, for example, one detector pulse in processing circuit output conductor 30 will, if scaled by a factor of four, correspond to four observed gamma radiations. The processing circuit 27 also sends high voltage power and control signals for the neutron source 24 through a cable or conductor 31.

The second logging tool in the sonde 20 included for illustrative purposes, is a two detector neutron porosity tool 32. The porosity tool 32 includes a neutron source 33 that irradiates the earth formation 23. Usually, a "chemical" or "natural" source is suitable for this purpose. For example, a 5 to 20 curie mixture of plutonium-238 and beryllium, or a mixture of americium and beryllium or, perhaps, one of the transplutonium elements that emit a generally continuous flux of neutrons are adequate as a neutron source.

The source 33 is supported in a holder 34 and is separated from a short spaced neutron detector 35 by means of a neutron absorbing shield 36. The shield 36 preferably comprises a boron carbide cylinder that reduces the energy of the emitted neutrons to thermal equilibrium with the shield materials and absorbs these "thermal" neutrons without emitting undesirable background gamma radiation. An annular aluminum spacer 37 circumscribes the short spaced detector 35 to properly align the detector 35 with the centerline of the housing 22 inasmuch as the transverse dimensions of the detector 35 are smaller than those of the sonde.

A long spaced neutron detector 40 is positioned immediately above the short spaced detector 35. The long spaced detector 40 occupies substantially the entire transverse area of the interior of the cartridge housing 22 in order to provide the maximum possible neutron sensitivity commensurate with the confines of the housing 22. Preferably, the detectors 35 and 40 are $He^3$ filled tubes that produce charge pulse in response to ionization in the $He^3$ filling gas. The ionization is caused by reactions between the neutrons scattered back to the tool 32 by the formation 23 and the $He^3$ nuclei in the filling gas.

These charges are sent through conductors 41 and 42, respectively, to a downhole processing circuit 43. The processing circuit 43 conditions the detector signals for further manipulation within the cartridge housing 22 in a manner similar to that described in connection with the processing circuit 27.

The processed short spaced detector signals are sent through a conductor 44 and the processed long spaced signals are sent through a conductor 45 to a downhole time division multiplexing circuit 46.

The logging tool 32 provides a measure of the porosity of the earth formation 23. A ratio of the two detector signals, where the mineral character of the earth formation is known, is an excellent quantitative measure of the porosity.

The third illustrative logging tool, a natural gamma radiation logging tool 47, is positioned within the housing 22 above the two-detector logging tool 32. Different earth formations ordinarily exhibit distinctive natural radioactive characteristics. These distinctive characteristics often are used as depth references. For example, limestone and dolomite emit a much lower natural gamma radiation intensity than sedimentary formations. Shale, in contrast, is a typical sedimentary formation that emits a relatively higher natural radioactivity.

As shown in FIG. 1 of the drawing, the natural gamma radiation tool 47 comprises a scintillation detector 50 that sends charge pulses that are generated in response to each detected gamma ray through a conductor 51 to a downhole processing circuit 52. The processing circuit preferably discriminates against noise and amplifies the input pulses in order to establish a train of uniform output pulses for transmission through a conductor 53 to the downhole time division multiplexing circuit 46.

The time division multiplexer 46 receives and temporarily stores the pulses from each of the logging tools 21, 32 and 47. These stored signals are drawn in sequential order from the memory, each during a specific recurring interval relative to the other stored signals. These signals are transmitted to the earth's surface in their proper relative time sequence, the memory storing new data for transmission from each of the logging tools during the transmission or time slots for the other signals.

The individual intervals, or time slots, usually bearing respective information pulses are thus "interleaved" in time. An additional time slot is interleaved with the illustrative three logging tool signals for synchronization purposes. This synchronization time slot always bears a pulse in contrast to the other slots that may or may not transmit a pulse in any particular sequence of time slots, depending on the intensity of the observed radiation.

Although the invention is not limited to any one or combination of the three logging tools shown in the sonde 20, the three tools herein described are especially useful for the identification of oil in those boreholes that have been completed with steel casing 54 and an annulus of cement 55. Usually, the sonde 20 is lowered into the borehole by means of the cable 57 through a winch system (not shown) on the earth's surface. The formation 23 is then logged as the sonde 20 is drawn upward through the borehole.

On the earth's surface the time division multiplexed signals in the conductor 56 are applied first to an amplifier 60 and then through a conductor 61 to time division demultiplexer 62. As hereinafter described, the demultiplexing circuit 62, under the control of the sync pulse in the synchronization time slot, separates the interleaved logging tool signals in the other three time slots and routes the signals in each of these slots to their respective analytical circuits. For instance, the signal from the pulse neutron logging tool 21 when demultiplexed, is sent through a conductor 63 to pulse neutron circuits 64. The pulse circuits 64 convert this demultiplexed input signal into an indication of the chlorine concentration of the earth formation 23. Typically, this concentration is represented as the thermal neutron decay time, or the time required for the pulse neutron population in the formation to decrease by a factor of $1/e$ (where $e=2.72$).

The demultiplexed signal from the neutron porosity tool 32 is sent through a conductor 65 to two detector neutron circuits 66. The circuits 66 preferably generate a signal or a log, if desired, of the earth formation porosity in terms of borehole depth. Where the porosity composition of the earth formation is known, the ratio of the neutron detector count rates provides a reliable indication of the formation's porosity. Usually the mineral character of the formation can be identified through an examination of the drill cuttings recorded in the "driller's log" and the like.

The natural gamma radiation logging tool signal, after demultiplexing, is sent through a conductor 67 to natural gamma-ray circuits 70 to generate, for example, a log of radiation intensity as a function of borehole depth.

Shown illustratively are combined signal circuits 68 that manipulate the pulse and two detector neutron circuit signals along with the natural gamma-ray signal. The circuits 68 produce, for example, an improved porosity or chlorine signal as well as a further signal that is related to some other earth formation property.

Figure 8:
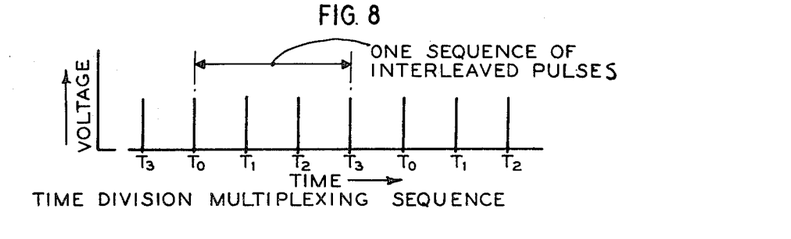
FIG. 8 is a diagram of a typical sequence of time slots.

A typical sequence of interleaved time slots is shown in FIG. 8. For illustrative purpose, pulses are shown in each of the time slots. For example, the pulse at time $T_o$ is the sync pulse. The pulse at time $T_1$ is accorded to the short spaced detector signal and the pulse at time $T_2$ is from the long spaced detector signal. The time $T_3$ pulse is reserved for the signal from the natural gamma-ray tool.

For illustrative brevity, the pulse neutron tool signal will be omitted from the following description. Provision for extra memory storage and additional time slots can be made available to establish the need transmission capacity to handle the needed neutron tool signal, if required. The addition of a sonic tool to the housing 22, moreover, will impose a requirement for an inhibit circuit 69 (FIG. 2) in the downhole time division multiplexer 46. The inhibit circuit stops a programmer 94 (FIG. 2) during sonic tool operation in order to insure that all sources of possible cable noise are removed without imposing a need for resynchronization of the multiplexing system at the end of each sonic signal transmission. In order to accomplish this function, the inhibit signal stops the programmer in an operational condition that enables the programmer to emit first a sync pulse when the sonic tool inhibit signal is removed.

Figure 2:
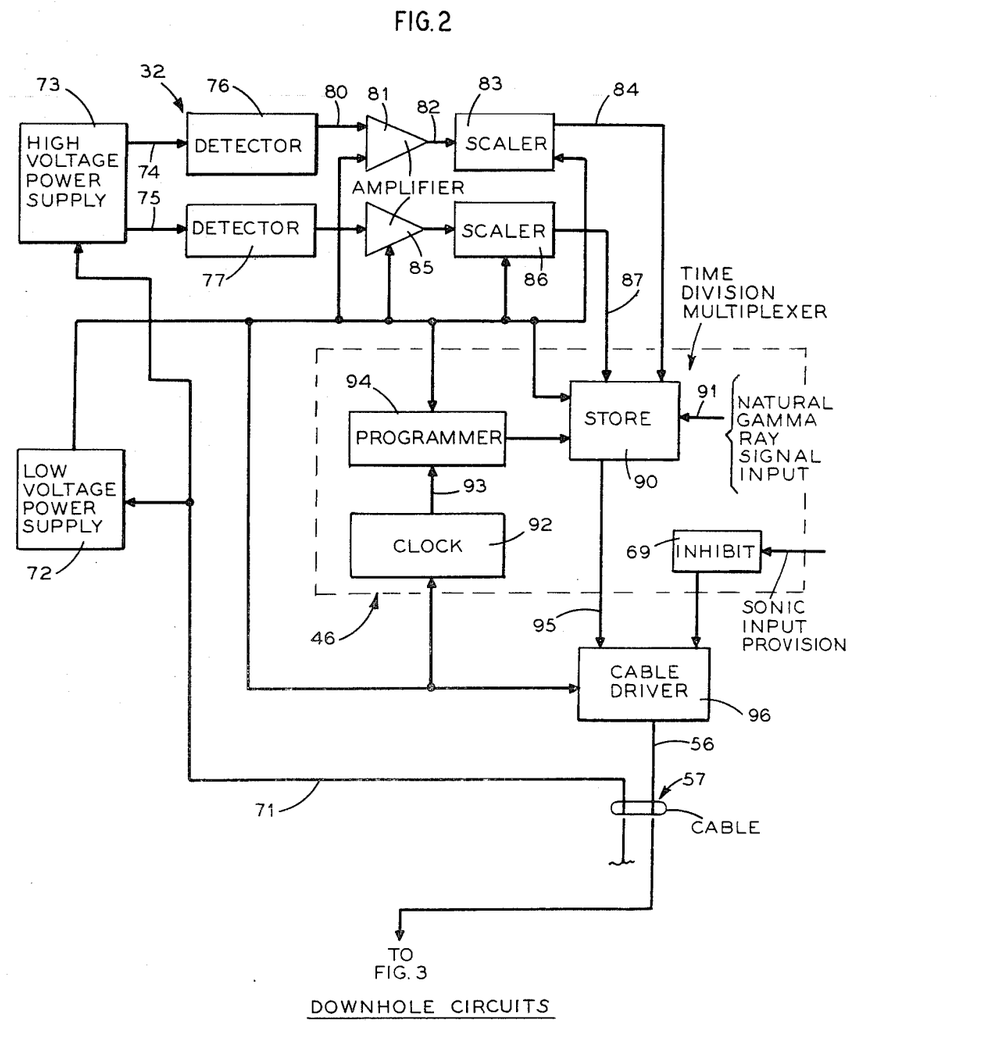
FIG. 2 is a block diagram of the downhole portion of a circuit suitable for use in connection with the logging system shown in FIG. 1.

FIG. 2 shows a typical downhole circuit for interleaving the sync signal and the signals from the two-detector neutron porosity tool with the natural gamma radiation logging tool signal. In this connection, power is sent downhole to the tool 32 through a conductor 71 in the armored cable 57 to a low voltage power supply 72 and a high voltage power supply 73.

The high voltage power supply 73 applies an appropriate electrical potential through conductors 74 and 75 to short spaced $He^3$ neutron detector 76 and long spaced $He^3$ neutron detector 77, respectively.

The short spaced detector signal is sent through a conductor 80 to a downhole amplifier 81. The amplified signal in output conductor 82 is coupled to a scaler 83 that divides the signal in conductor 82 by a factor of four. Thus an output pulse from the scaler circuit 83 in a conductor 84 corresponds to four detected neutrons. In a similar manner, signals from the long spaced detector 77 are sent through an amplifier 85 to a scaler 86 in order to reduce the input signals by a factor of four when transmitted through a conductor 87.

The scaled short spaced and long spaced signals in the conductors 84 and 87, respectively, are registered in a memory means, or store 90 in the time division multiplexer 46. The store 90 also temporarily holds or memorizes scaled input signals in a conductor 91 that correspond to the output from the natural gamma radiation logging tool 47 (FIG. 1).

The signals from the porosity and natural gamma radiation tools are held temporarily in the store 90, each until the appropriate time slot is reached in the sequence for their respective transmission to the earth's surface.

In order to accomplish this function, a clock 92 sends signals through a conductor 93 to a programmer 94 that controls the sequential withdrawal of the logging tool signals from the store 90 and the transmission of these signals and the sync pulse through a conductor 95 to a cable driver circuit 96. The circuit 96 conditions the interleaved signals for transmission through the conductor 56 in the cable 57 to the earth's surface.

Figure 3:
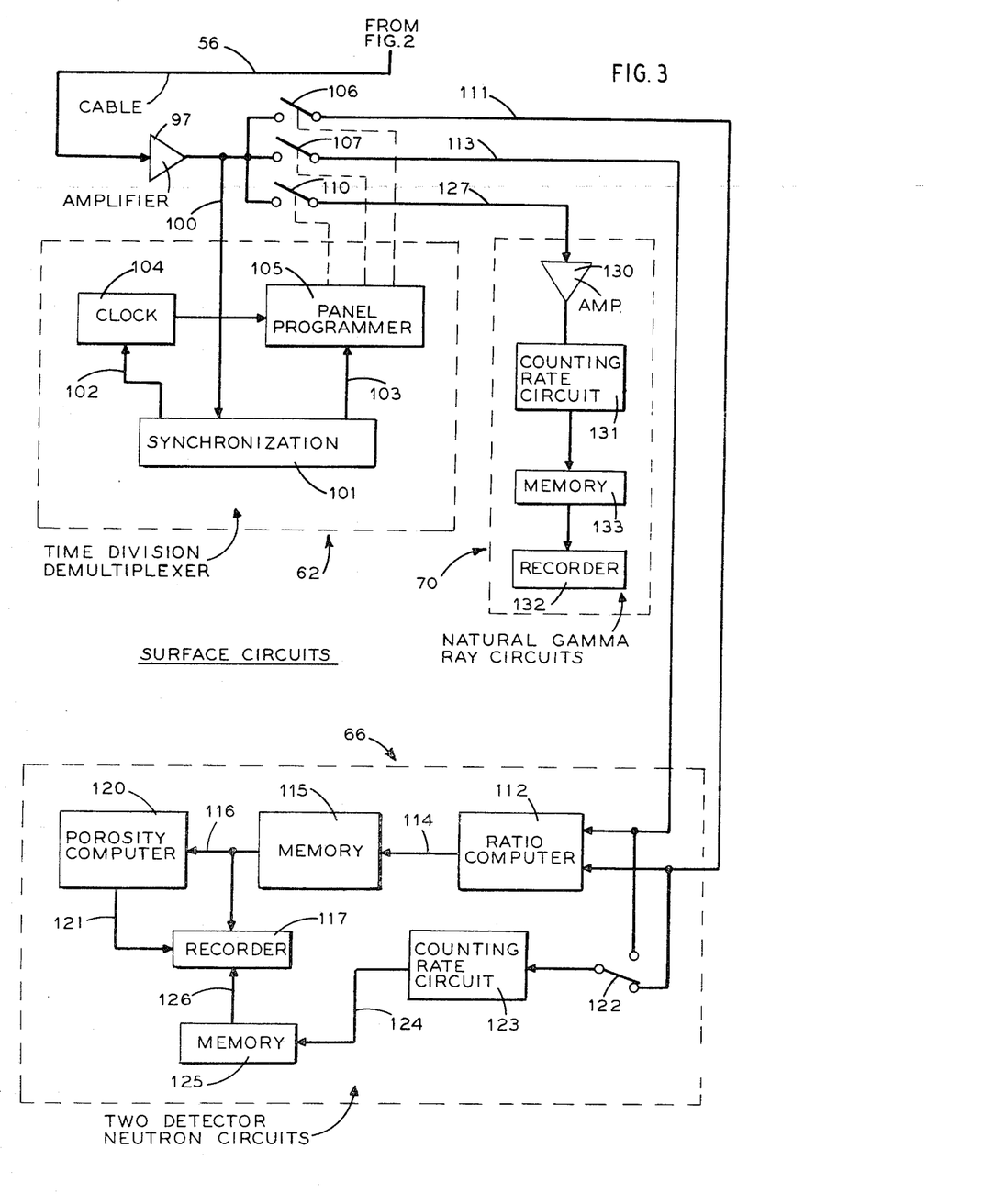
FIG. 3 is a block diagram of those portions of a circuit on the earth's surface suitable for use with the logging system shown in FIG. 1.
Figure 4:
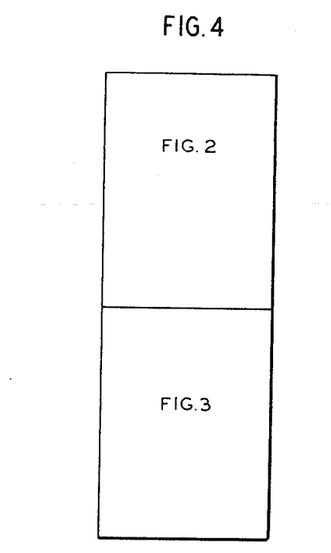
FIG. 4 is a diagram showing the general arrangement of FIGS. 2 and 3.

Arranging FIGS. 2 and 3 in the manner shown in FIG. 4 provides an illustrative block diagram of the entire time division multiplexing and demultiplexing system. As shown in FIG. 3, the sequence of time division multiplex logging tool signals in the conductor 56 is first received in an amplifier 97. The amplified signals are transmitted through a conductor 100 to a synchronization circuit 101 in the time division demultiplexing circuits 62. The synchronization circuit 101, at the completion of each sequence of interleaved multiplex signals, responds to the next occurring amplified pulse by transmitting signals through conductors 102 and 103 to a clock 104 and a panel programmer 105, respectively.

The combination of the clock 104 and the programmer 105 enables and disables switches 106, 107 and 110 in a predetermined sequence in order to distribute the signals in the associated time slots to the correct analytical circuits.

In accordance with the invention, information pulses do not occur in each sequence of logging tool signal time slots.

As a practical matter, the probability of finding a logging tool pulse in each slot in several repeated sequences of slots is small. If the programmer 105 enables one of the switches during the wrong time slot, the programmer 105 will rectify the error and lock in phase with the downhole multiplexer in the next received series of time slot sequences. The programmer 105 will shift to the next occurring pulse, and continue to shift until the synchronization circuit 101 begins to register on the always recurring sync pulse at time $T_0$. In this situation, the synchronization circuit 101 will begin enabling and disabling the switches 106, 107 and 110 in the order appropriate to the respective individually received time slots.

Assuming that the synchronization circuit 101 is acting in phase with the downhole programmer 94, the switch 106 closes before the pulse at time $T_1$ (FIG. 8). In this situation, the short spaced detector information is applied to conductor 111 and is registered in a ratio computer 112. Commencing prior to the time $T_2$, the programmer 105 disables the switch 106 and enables the switch 107 in order to apply the long spaced detector pulse $T_2$ through a conductor 113 to the ratio computer 112.

When the long spaced and short spaced detector signals are received in the ratio computer 112, the ratio of these two signals is calculated and sent through a conductor 114 to a memory means or circuit 115. This memory circuit, which is matched to the speed with which the logging tool is drawn through the bore-hole, applies the ratio through a conductor 116 to a recorder 117 to produce a record of count ratio as a function of borehole depth.

The ratio signal in the conductor 116 also is sent to a porosity computer 120. The porosity computer 120 converts the ratio signal into an output signal that corresponds to the porosity of the earth formation 23 (FIG. 1). The porosity signal is sent through a conductor 121 to the recorder 117.

The counting rate of either the long spaced or the short spaced detector also can be registered in the recorder 117 through the manipulation of a switch 122 that selectively connects either the long spaced detector or the short spaced detector signal information to a counting rate circuit 123 and from the circuit 123 through a path that includes a conductor 124, a memory 125 and a conductor 126 to the recorder 117.

In the appropriate slot in each sequence, the pulse at time $T_3$ (FIG. 8) allocated to the natural gamma radiation logging tool 47 (FIG. 1), is sent through the switch 110 (enabled in response to the programmer 105) through a conductor 127 and to an amplifier 130.

The amplified natural gamma-ray signal is converted into a count rate through the count rate circuit 131 and then is sent from the circuit 131 to a recorder 132 through a path that includes a tool speed synchronized memory means 133.

Figure 5:
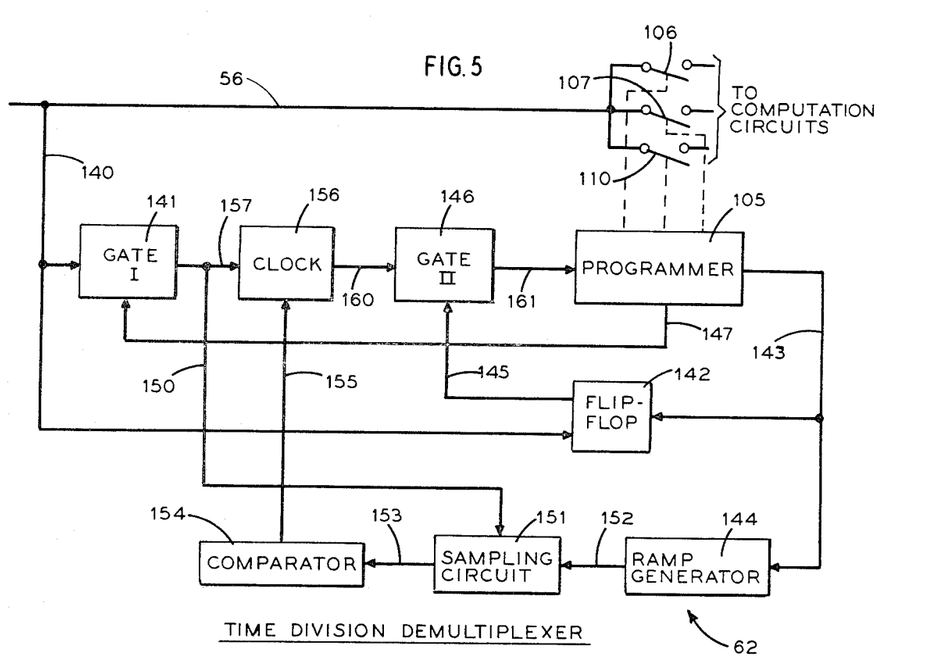
FIG. 5 is a block diagram of a typical time division demultiplexer for use in connection with the circuit shown in FIG. 3.

A typical time division demultiplexer 62 is shown in FIG. 5. Amplified sequences of signals from the logging tool sent through the conductor 56 also are applied through a conductor 140 to a gate 141 and a flip-flop circuit 142. In operation, the programmer 105, at the end of a sequence of switch operations, sends a pulse through a conductor 143 to the flip-flop circuit 142 and to a ramp generator 144. The flip-flop circuit 142, in response to the pulse from the programmer 105, sends a disabling signal through a conductor 145 to disable or close a gate 146. At the end of the cycle of switch operation, the programmer 105 also sends a signal through a conductor 147 that enables the gate 141. Signals then in the conductor 140 are passed through the gate 141 and from thence through the conductor 150 to a sampling circuit 151.

It will be recalled that an end of switching sequence pulse was sent from the programmer 105 through the conductor 143 to the ramp generator 144. This pulse triggered the ramp generator 144 in order to produce a signal in a ramp generator output conductor 152 that increased in voltage with the passage of time. The increasing ramp voltage in the conductor 152 is coupled to the sampling circuit 151. The pulse output from the enabled gate 141, when received at the sampling circuit 151, gates the amplitude of the ramp signal at the time of pulse receipt through a conductor 153 to a comparator 154. The comparator in effect measures the ramp voltage at the time of sampling against a predetermined standard voltage and sends a control signal through a conductor 155 to a clock 156.

At the time the gate 141 was enabled to pass the next received signal pulse through the conductor 150 to the sampling circuit 151, this same pulse was also sent through a conductor 157 to the clock 156. This pulse resets the phase of the clock 156 so that subsequent signals emitted from the clock through a conductor 160 to the gate 146 are in phase with the downhole multiplexing circuit.

The control signal from the comparator 154 changes the frequency of the clock in accordance with the duration of the individual time slots in order to match the duration of the times in which the switches 106, 107, 110 are closed with the actual duration of the time slots determined in the downhole multiplexer. Because the signal in the conductor 143 from the programmer 105 at the end of a switching sequence caused the flip-flop 142 to disable the gate 146, none of the clock pulses in the conductor 160 can reach the programmer 105.

The flip-flop 142, however, also receives the first input after the end of a switching sequence through the conductor 140. This pulse in the conductor 140 causes the flip-flop 142 to enable the gate 146 in order to pass the clock pulses through a conductor 161 to the programmer 105. The clock pulses received in the programmer 105 initiate another switching cycle. This cycle is in phase with the pulse sequence and has a frequency that matches the duration of the time slots in the sequence of pulses.

In accordance with the invention, each time a switching cycle is completed, the entire cycle commences once again in response to the next received logging tool pulse. This system will quickly lock into operation with the ever recurring sync pulses in each time slot sequence.

Figure 6:
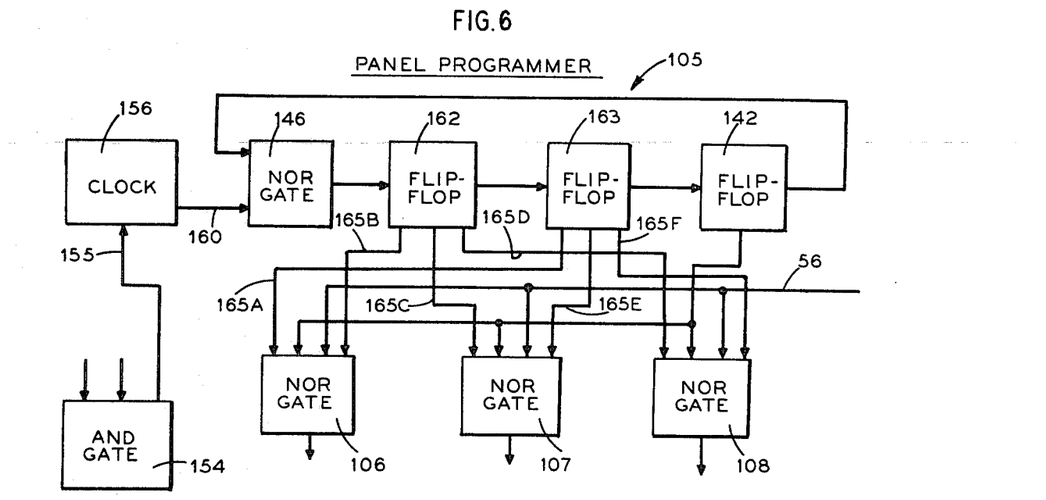
FIG. 6 is a block diagram of a typical programmer circuit for use in the demultiplexer shown in FIG. 5.

FIG. 6 shows a block diagram of a typical programmer 105. As shown, the programmer comprises two flip-flop circuits 162 and 163. These circuits constitute a synchronous divider for the input signals received at the enabled gate 146 from the clock 156. Accordingly, for each four input signals that are gated to the flip-flop circuit 162, the flip-flop circuits 162 and 163 produce a pattern of output pulses. These pulses are applied through conductors 165A to 165F to the switches 106, 107 and 110 (shown in FIG. 6 for illustrative purposes as NOR gates). These signals enable and disable the switches in a cycle that is appropriate to the order in which the time division slots are received at the gates 106, 107 and 110 from the conductor 56. This switching cycle is predicated on the assumption that the first-received multiplex pulse after the termination of the preceding switching cycle is the sync pulse.

It will be recalled that the clock 156 is controlled through a comparator 154 (shown in FIG. 6 as an AND gate). The comparator 154 sends a signal through the conductor 155 that corresponds to the ramp voltage amplitude at the time the presumed sync pulse is received. The amplitude of the ramp voltage adjusts the clock frequency in order to match the operation of the programmer circuit flip-flop circuits 162 and 163 to the duration of time slots.

Figure 7:
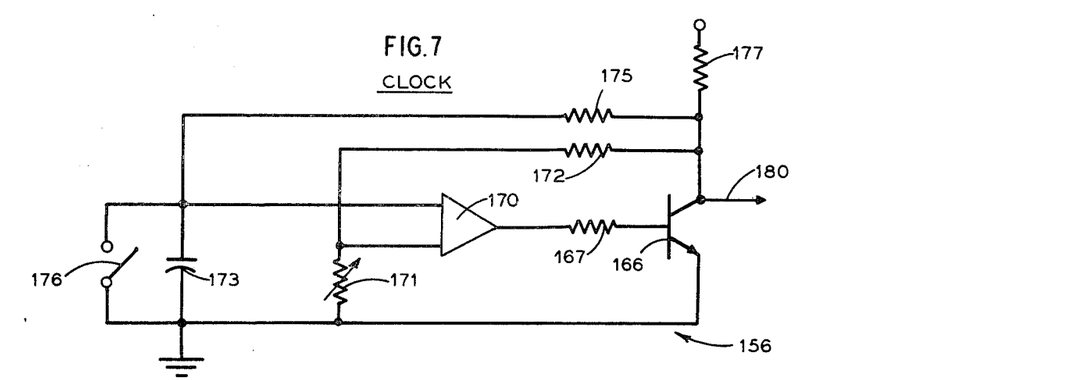
FIG. 7 is a typical clock circuit also suitable for use in the FIG. 5 demultiplexer.

The clock circuit, a specific example of which is shown in FIG. 7, comprises an NPN transistor 166, a biasing resistance 167, an amplifier 170, a voltage divider comprising two resistances 171 and 172, a time constant circuit that includes a capacitor 173 and a resistance 175. Clock phase control, moreover, is adjusted through a switch 176 (symbolically reflecting the gate 141 in FIG. 5).

In operation, the transistor 166 ordinarily is disabled and does not conduct current. In this situation, a charge builds up on the capacitor 173 through a path that includes ground, the capacitor 173, the resistor 175, a resistor 177 and a power supply. When the charge on the capacitor 173 reaches a level that is determined by the ratio of the variable resistor 171 to the sum of the resistances 172, 171 and 177, the amplifier 170 provides sufficient bias turn on to the transistor 166 and enable the transistor to conduct current. In this situation, the point common to the resistors 172, 175 and 177 is effectively connected to the ground causing the capacitor 173 to discharge to ground. After the capacitor 173 has discharged, the amplifier turns off the transistor 166 and effectively disconnects the resistors 172, 175 and 177 from ground. The deactivated transistor 166 then allows the charge to once more build up on the capacitor 173. This repeated charging and discharging of the capacitor 173 produces a square wave at an output conductor 180. The frequency of this charge and discharge cycle is determined by the setting of the variable resistor 171. This resistor setting, moreover, symbolically reflects the amplitude of the ramp voltage at the time of sampling described in more complete detail in connection with FIG. 5.

In order to reset the phase of the clock to match the commencement of each charging cycle with the arrival of each of the amplified input sync pulses in the conductor 56 (FIG. 5), the switch 176 is operated to connect both terminals of the capacitor 173 to ground, thus discharging the capacitor. When the switch 176 is operated to open the circuit, a new charging cycle can begin. This phase control, it will be recalled, also was discussed in connection with FIG. 5 in which the gate 141 functioned in the role of the switch 176.

What is claimed is:

1. A time division demultiplexing signal system for demultiplexing a plurality of time division signals comprising a programmer for producing a signal at the end of a predetermined sequence of time slots, each time slot adapted to contain a time division signal; a ramp generator triggered by said programmer signal; gate means responsive to the next occurring time division signal after said predetermined time slot sequence to transmit the amplitude of said ramp generator output at the time of said time division signal; a variable frequency circuit, the output frequency of which is controlled in response to said gated ramp output; switch means for segregating said multiplexed signals in accordance with an established cycle of switch operation; and further circuit means responsive to said next occurring time division signal for initiating said cycle of switch operation.

2. A transmission system for a logging tool comprising: a plurality of signal sources in said logging tool for producing a plurality of data signals representative of various subsurface characteristics; storage means for temporarily storing said data signals; downhole control means for periodically generating a plurality of signals including a synchronization signal and control signals representative of time periods during which signals form each of said sources are to be transmitted to the surface of the earth, said synchronization signal having a predetermined time relationship to said time periods; means responsive to said control signals for interrogating said storage means for the presence of data signals and transmitting representations of said stored data signals and synchronization signal to the surface of the earth; means at the surface of the earth for receiving and identifying said transmitted signals, including clock means for generating a clock signal, surface control means responsive to said clock signal for generating signals which include identification signals which identify the time periods when transmitted signals corresponding to each source are expected, and means responsive to a generated signal from said control means for causing a selected transmitted signal received at the surface of the earth to synchronize the operation of said clock or surface control means with that of said downhole control means.

3. In a transmission system for a logging tool, apparatus for demultiplexing a transmission signal which is characterized by a repetitive sequence which includes a plurality of time periods individually allotted to a data signal from each of a plurality of information sources and a synchronization signal wherein there exists a probability of non-recurrence of a data signal in those time periods allotted to data signals comprising: means for receiving the transmission signal, clock means for generating a clock signal; control means responsive to said clock signal for generating signals which include identification signals which identify the time periods of said transmission signal corresponding to each information source; synchronization means responsive to a generated signal from said control means for causing a selected received signal to synchronize said clock signal or identification signals with said transmission signal.

4. The apparatus of claim 3 wherein said synchronization means includes gate means responsive to a signal from said control means for gating a received signal to said clock means during a time period when a synchronization signal is expected to enable synchronization of said clock and transmission signals.

5. The apparatus of claim 3 wherein said synchronization means includes gate means adapted to inhibit application of said clock signal to said control means; means responsive to a signal from said control means for energizing said gate means to inhibit application of said clock signal to said control means at the beginning of a time period during which a synchronization signal is expected, the next received signal during said time period when a synchronization signal is expected operating to cause said gate means to pass said clock signal to said control means.

6. The apparatus of claim 3 wherein said synchronization means includes gate means responsive to a signal from said control means for passing a received signal, frequency control means responsive to said passed signal from said gate means and a signal from said control means for generating an output signal representative of the time interval between said two signals applied to said frequency control means, and means for applying said output signal to said clock means to control the frequency of said clock signal.

7. The apparatus of claim 3 wherein each transmission signal sequence comprises a first time period for a synchronization signal and a plurality of subsequent time periods for data signals from said information sources, and wherein said control means produces a termination signal at the end of each transmission signal sequence, and wherein said synchronization means includes gate means responsive to said termination signal from said control means for gating a received signal to said clock means during a time period at the end of said transmission signal sequence to enable phase synchronization of said clock and transmission signals.

8. The apparatus of claim 3 wherein each transmission signal sequence comprises a first time period for a synchronization signal and a plurality of subsequent time periods for data signals from said information sources, and wherein said control means produces a termination signal at the end of said transmission signal sequence, and wherein said synchronization means includes gate means adapted to inhibit application of said clock signal to said control means; means responsive to said termination signal from said control means for energizing said gate means to inhibit application of said clock signal to said control means during a time period beginning with the end of said sequence, the next received signal after said termination signal operating to cause said gate means to pass said clock signal to said control means.

9. The apparatus of claim 3 wherein each transmission signal sequence comprises a first time period for a synchronization signal and a plurality of subsequent time periods for data signals from said information sources, and wherein said control means produces at least one termination signal at the end of each transmission signal sequence, and wherein said synchronization means includes gate means responsive to a termination signal from said control means for passing a received signal, frequency control means responsive to said passed signal from said gate means and a termination signal from said control means for generating an output signal representative of the time interval between said two signals applied to said frequency control means, and means for applying said output signal to said clock means to control the frequency of said clock signal.

10. The apparatus of claim 3 and further including a plurality of utilization devices, each adapted for individually receiving the data signals from an information source, means responsive to said identification signals from said control means for gating the data signals corresponding to each information source to corresponding utilization devices.

* * * * *